(12) United States Patent
Nomura

(10) Patent No.: US 7,735,766 B2
(45) Date of Patent: Jun. 15, 2010

(54) SEATBELT RETRACTOR

(75) Inventor: Yasuaki Nomura, Tokyo (JP)

(73) Assignee: Takata Corporation, Tokyo (JP)

( * ) Notice: Subject to any disclaimer, the term of this patent is extended or adjusted under 35 U.S.C. 154(b) by 769 days.

(21) Appl. No.: 11/496,570

(22) Filed: Aug. 1, 2006

(65) Prior Publication Data

US 2007/0029428 A1 Feb. 8, 2007

(30) Foreign Application Priority Data

Aug. 4, 2005 (JP) ............................. 2005-226390

(51) Int. Cl.
  *B60R 22/44* (2006.01)
  *B60R 22/46* (2006.01)
(52) U.S. Cl. .................. 242/390.2; 242/390.8; 475/153
(58) Field of Classification Search ................. 242/374, 242/390.2, 390.8, 390.9; 280/806, 807; 297/475–478; 475/2, 4, 14, 149, 153, 317
  See application file for complete search history.

(56) References Cited

U.S. PATENT DOCUMENTS

| | | | | |
|---|---|---|---|---|
| 1,330,790 | A * | 2/1920 | Dean ........................... | 318/13 |
| 2,466,231 | A * | 4/1949 | Guinn et al. ................. | 318/675 |
| 3,362,686 | A * | 1/1968 | Mackay ....................... | 198/835 |
| 4,189,107 | A * | 2/1980 | Quenot et al. ............. | 242/390.1 |
| 4,611,688 | A * | 9/1986 | Sekhar ........................ | 182/237 |
| 4,760,989 | A * | 8/1988 | Elliott et al. ........... | 251/129.03 |
| 6,360,981 | B1 | 3/2002 | Specht | |
| 6,604,597 | B2 * | 8/2003 | Fujii et al. .................. | 180/268 |
| 6,848,645 | B2 * | 2/2005 | Peter ........................ | 242/390.9 |
| 7,140,571 | B2 * | 11/2006 | Hishon et al. ............ | 242/390.8 |
| 2005/0011980 | A1 * | 1/2005 | Prokscha et al. ............ | 242/374 |
| 2005/0061904 | A1 | 3/2005 | Inuzuka et al. | |
| 2005/0077412 | A1 | 4/2005 | Tanaka et al. | |
| 2005/0098997 | A1 | 5/2005 | Tanaka et al. | |

FOREIGN PATENT DOCUMENTS

| | | |
|---|---|---|
| EP | 1 223 089 A2 | 7/2002 |
| EP | 1 514 749 A2 | 3/2005 |
| EP | 1 516 789 A2 | 3/2005 |
| EP | 1 518 766 A1 | 3/2005 |
| EP | 1 531 099 A1 | 5/2005 |
| JP | 51-137224 | 11/1976 |
| JP | 1-123759 | 8/1989 |

* cited by examiner

*Primary Examiner*—John Q Nguyen
*Assistant Examiner*—Scott Haugland
(74) *Attorney, Agent, or Firm*—Foley & Lardner LLP

(57) ABSTRACT

A seatbelt retractor reduces the temporary weight during seatbelt withdrawal to increase an occupant's comfort. When a seatbelt is not being worn by an occupant (off), projections of an internal gear are placed in a circumferential center between adjacent projections by the spring force of springs. When a spool rotates in the belt withdrawing direction, the internal gear also rotates in the belt withdrawing direction. This arrangement disables a reduction mechanism's power transmission to cut off the direct connection between the spool and electric motor connected to a sun gear to reduce the temporary weight during withdrawal of the seatbelt. When the internal gear rotates at a predetermined angle, the projections come into contact with the projections to thereby stop the rotation of the internal gear. This enables the power transmission of the reduction mechanism, whereby the spool and electric motor are brought into direct connection via the reduction mechanism.

10 Claims, 5 Drawing Sheets

FIG. 4(a)
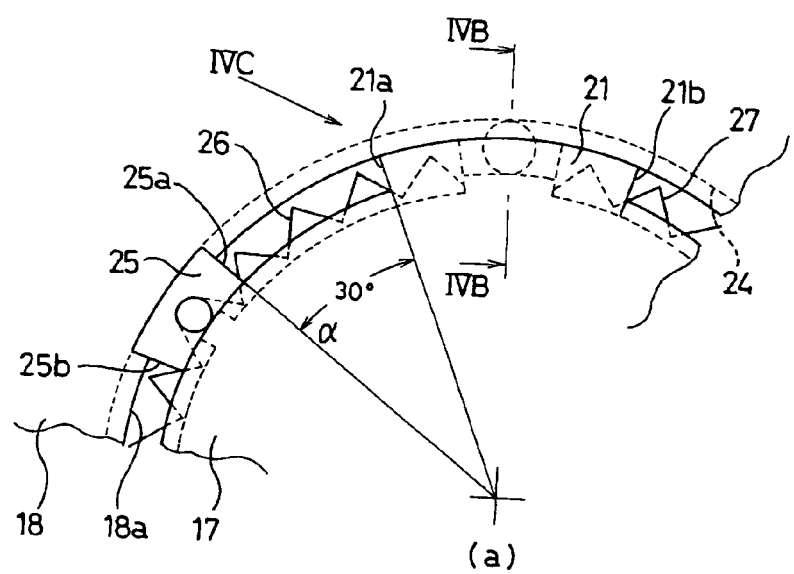
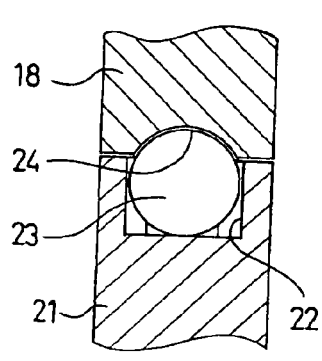
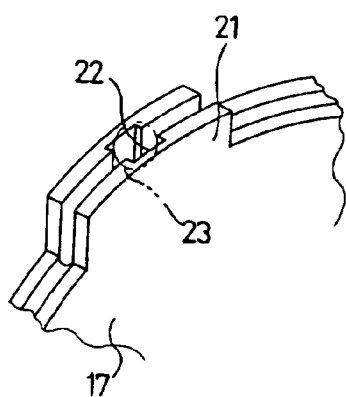
FIG. 4(b)
FIG. 4(c)

SEATBELT RETRACTOR

BACKGROUND

The present invention relates to a seatbelt retractor and a seatbelt system having the same installed in vehicles such as cars, in which the retractor retracts and withdraws the seatbelts by the rotation of a spool with the driving force of a motor and is used for restraining occupants with seatbelts to protect occupants.

Seatbelt systems installed in vehicles such as cars restrain occupants with seatbelts in an emergency in which high deceleration is applied to vehicles, such as a vehicle crash, to prevent the inertial movement of the occupants from seats, thereby protecting the occupants. The seatbelt systems have a seatbelt retractor that retracts and withdraws a seatbelt with a spool and stops the withdrawal of the seatbelt in an emergency.

PCT Japanese Translation Patent Publication No. 2003-507252 ("JP Pub. No. '252") discloses a seatbelt retractor that retracts and withdraws a seatbelt with an electric motor, which is incorporated by reference herein in its entirety. In the seatbelt retractor disclosed in JP Pub. No. '252, an electric motor is disposed in series coaxially with a belt reel (hereinafter, also referred to as a spool) on one axial side of the belt reel, in which the rotation of the electric motor is transmitted to the belt reel while being reduced in speed by a reduction mechanism including a planetary reduction gear mechanism. As the belt reel is rotated by the rotation of the electric motor in a belt retracting direction or a belt withdrawing direction, the seatbelt is retracted by or withdrawn from the belt reel.

SUMMARY

One embodiment of the invention relates to a seatbelt retractor. The seatbelt retractor includes a spool for withdrawably retracting a seatbelt; a motor that generates a torque for rotating the spool in a belt retracting direction and a belt withdrawing direction; a reduction mechanism that connects the spool and the motor directly with each other to transmit the rotation of the motor while reducing the speed of the rotation of the motor, the seatbelt retractor driving the rotation of the motor in the belt withdrawing direction as the seatbelt is withdrawn; and a spool and motor disconnecting mechanism that temporarily disconnects the direct connection between the spool and the motor when the seatbelt is withdrawn.

Another embodiment of the invention provides a seatbelt system. The seatbelt system includes a seatbelt for restraining an occupant; a tongue slidably supported by the seatbelt; a buckle detachably latched with the tongue; and a seatbelt retractor. The seatbelt retractor includes a spool for withdrawably retracting a seatbelt; a motor that generates a torque for rotating the spool in a belt retracting direction and a belt withdrawing direction; a reduction mechanism that connects the spool and the motor directly with each other to transmit the rotation of the motor while reducing the speed of the rotation of the motor, the seatbelt retractor driving the rotation of the motor in the belt withdrawing direction as the seatbelt is withdrawn; and a spool and motor disconnecting mechanism that temporarily disconnects the direct connection between the spool and the motor when the seatbelt is withdrawn.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 4(a) is a fragmentary enlarged view of FIG. 3.

FIG. 4(b) is a cross-sectional view taken along line IVB-IVB of FIG. 4(a).

FIG. 4(c) is a fragmentary perspective view, viewed along arrow IVC of FIG. 4(a).

DETAILED DESCRIPTION

Figure 1:
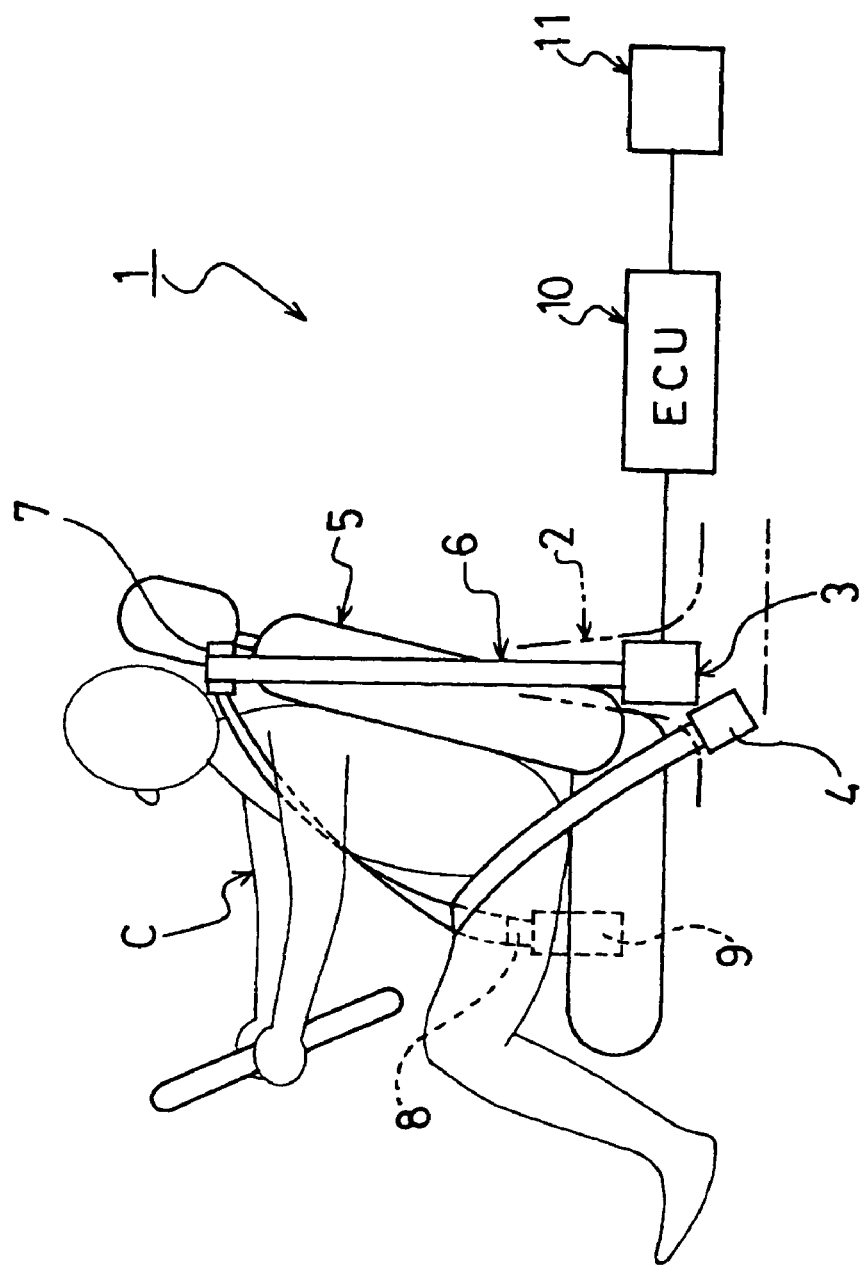
FIG. 1 is a schematic diagram of a seatbelt system having a seatbelt retractor according to an embodiment of the invention.

In general seatbelt retractors driven by electric motors including the seatbelt retractor disclosed in JP Pub. No. '252, a spool and an electric motor are directly connected via a reduction mechanism. A seatbelt is retracted and withdrawn by the spool when the electric motor is driven to retract and withdraw the seatbelt and the driving force is transmitted to the spool via the reduction mechanism. In this case, the electric motor is not driven during the initial state because no power is applied thereto. When an occupant withdraws the seatbelt to rotate the rotation shaft (rotor) of the electric motor, the electric motor is driven by sensing the rotation of the rotation shaft of the electric motor with a sensor. Thus, the motor-driven seatbelt retractor exhibits an assist function by the driving force of the electric motor during the withdrawal of the seatbelt to reduce the weight during withdrawing the seatbelt. The weight during withdrawing the seatbelt is a belt withdrawing resistance that is principally generated from the cogging torque of the electric motor amplified by an amount of gear ratio by the reduction mechanism.

However, when the electric motor is driven by the withdrawal of the seatbelt by the occupant, the occupant temporarily feels uncomfortable due to the weight during withdrawing of the seatbelt, because the spool and the electric motor are connected directly via the reduction mechanism. Thus, the occupant cannot wear the seatbelt comfortably.

Embodiments of the present invention are made in consideration of the above. Accordingly, it is an object of the invention to provide a motor-driven seatbelt retractor in which the temporary weight during withdrawing of a seatbelt is reduced so that any uncomfortable feeling caused by the seatbelt can be reduced.

It is another object of the invention to provide a seatbelt system in which the occupant can wear a seatbelt comfortably.

In order to achieve the above objects, a seatbelt retractor of a first embodiment includes a spool for retracting a seatbelt withdrawably; a motor that generates a torque for rotating the spool in a belt retracting direction and a belt withdrawing direction; and a reduction mechanism that connects the spool and the motor directly with each other to transmit the rotation of the motor while reducing the speed of the rotation of the motor, the seatbelt retractor driving the rotation of the motor in the belt withdrawing direction as the seatbelt is withdrawn, wherein the seatbelt retractor further includes a spool and motor disconnecting mechanism that temporarily disconnect the direct connection between the spool and the motor when the seatbelt is withdrawn.

A seatbelt retractor of a second embodiment is characterized in that the reduction mechanism includes a sun gear, an internal gear, planetary gears in engagement with the sun gear and the internal gear, and a carrier supporting the planetary gears rotatably; the sun gear is disposed so as to rotate with a rotor of the motor, and the carrier is disposed so as to rotate with the spool; the internal gear is disposed so as to rotate in the belt withdrawing direction by a predetermined amount at least when the seatbelt is withdrawn; and the spool and motor disconnecting mechanism includes internal-gear-rotation enabling mechanism that allows the internal gear to temporarily rotate in the belt withdrawing direction by a predetermined amount and to stop the internal gear from rotating in the belt withdrawing direction by an amount exceeding the predetermined amount when the seatbelt is withdrawn.

A seatbelt retractor of a third embodiment is characterized in that the spool and the reduction mechanism are supported by a frame; and the internal-gear-rotation enabling mechanism includes a frame-side stopper provided to the frame and an internal-gear-side stopper that comes into contact with the frame-side stopper when the internal gear rotates in the belt withdrawing direction by the predetermined amount to thereby stop the rotation of the internal gear in the belt withdrawing direction.

A seatbelt system of a fourth embodiment includes at least a seatbelt for restraining an occupant, a seatbelt retractor for withdrawably retracting the seatbelt, a tongue slidably supported by the seatbelt, and a buckle with which the tongue is detachably latched, wherein the seatbelt retractor is the seatbelt retractor according to any one of the above described embodiments.

The seatbelt retractor of the above described embodiments includes the spool and motor disconnecting mechanism. This arrangement enables the direct connection between the spool and the motor to be temporarily disconnected at the start of the withdrawal of the seatbelt, and enables the direct connection between the spool and the motor via the reduction mechanism when the seatbelt is withdrawn by an amount exceeding a predetermined amount. Thus the temporary weight during withdrawing the seatbelt (belt withdrawing resistance) due to the cogging torque of the motor can be reduced. The uncomfortable feeling during the withdrawal of the seatbelt can therefore be reduced.

According to the second embodiment, the reduction mechanism includes the planetary gear mechanism, while the spool and motor disconnecting mechanism includes internal-gear-rotation enabling mechanism that allows the internal gear to temporarily rotate in the belt withdrawing direction by a predetermined amount and to stop the internal gear from rotating in the belt withdrawing direction by an amount exceeding the predetermined amount when the seatbelt is withdrawn. Thus the planetary gear mechanism of the reduction mechanism can be used for the internal-gear-rotation enabling mechanism. This simplifies the structure of the seatbelt retractor.

According to the third embodiment, the internal-gear-rotation enabling mechanism is a stopper with a simple structure. This further simplifies the structure of the seatbelt retractor.

The seatbelt system in embodiments of the invention includes the seatbelt retractor of the above described embodiments. Accordingly, the occupant can wear the seatbelt comfortably when withdrawing the seatbelt without sensing the weight due to the cogging torque of the motor.

A best mode for carrying out the present invention will be described with reference to the drawings.

FIG. 1 is a schematic diagram of a seatbelt system having a seatbelt retractor according to an embodiment of the invention. The left and right in the following description denote the left and right in the corresponding diagram used in the description.

Referring to FIG. 1, the seatbelt system 1 includes a seatbelt retractor 3 fixed to a B-pillar 2 or the like of the vehicle body and driven by an electric motor; a seatbelt 6 withdrawn from the seatbelt retractor 3 and fixed to the floor of the vehicle body or a vehicle seat 5 with a belt anchor 4 at the end; a guide anchor 7 disposed on the vehicle body (such as a center pillar), for guiding the seatbelt 6 withdrawn from the seatbelt retractor 3 toward a shoulder of an occupant C; a tongue 8 that is slidably supported by the seatbelt 6 guided from the guide anchor 7; a buckle 9 fixed to the floor of the vehicle body or the vehicle seat 5 and, into which the tongue 8 is detachably inserted; an electronic control unit (ECU) 10 for controlling the driving of the electric motor for the seatbelt retractor 3; and input units 11, such as collision sensor or object detector, for sending various input signals to the ECU 10 to control the electric motor.

Figure 2:
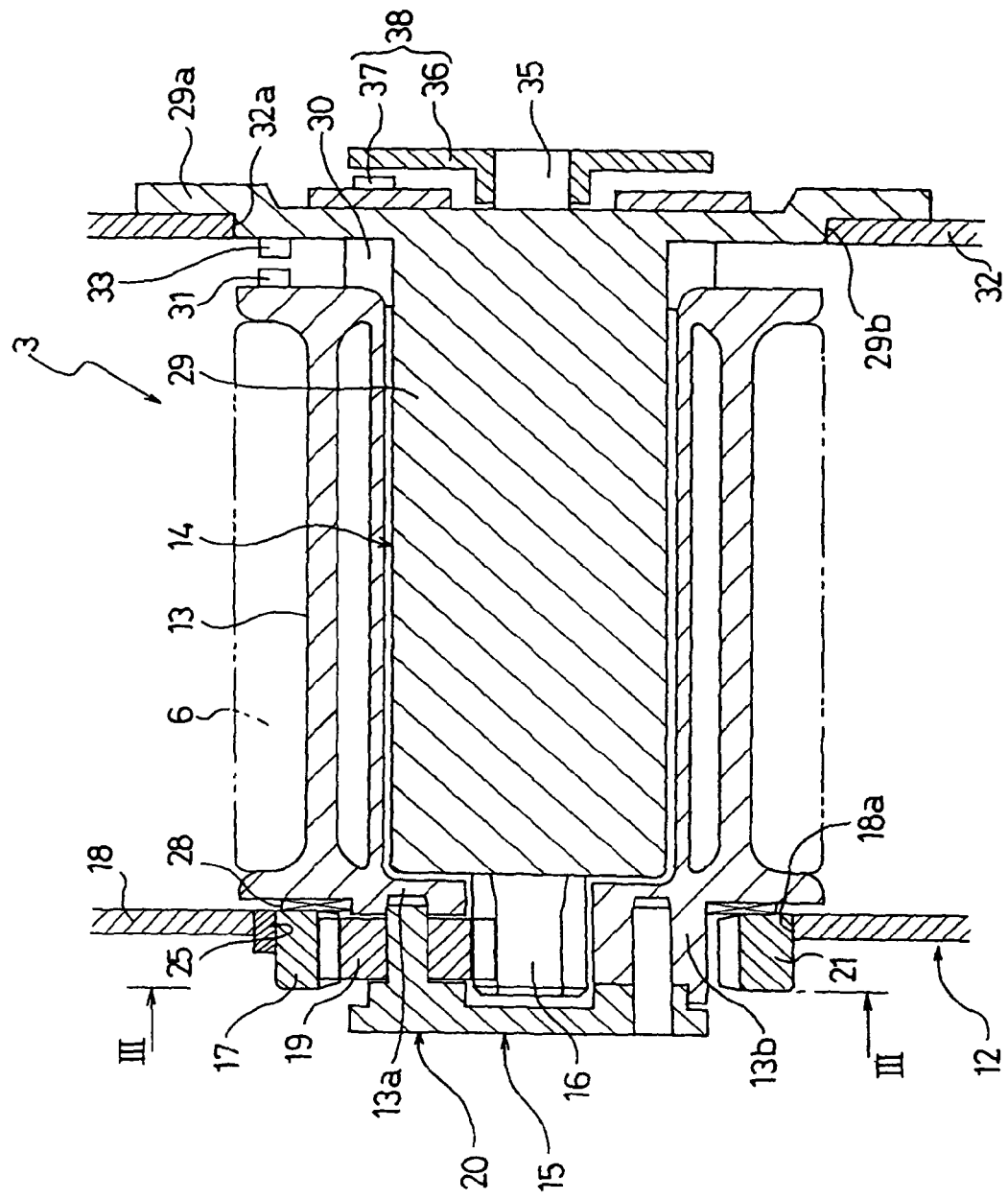
FIG. 2 is a schematic fragmentary sectional view of the seatbelt retractor used in the seatbelt system of FIG. 1.

FIG. 2 is a schematic fragmentary longitudinal sectional view of the seatbelt retractor of the embodiment.

As shown in FIG. 2, the seatbelt retractor 3 includes a base frame 12; a spool 13 for retracting the seatbelt 6; an electric motor 14 for rotating the spool 13; and a reduction mechanism 15 that directly connects the electric motor 14 and the spool 13 for reducing the torque of the electric motor 14 and transmitting it to the spool 13.

Figure 3:
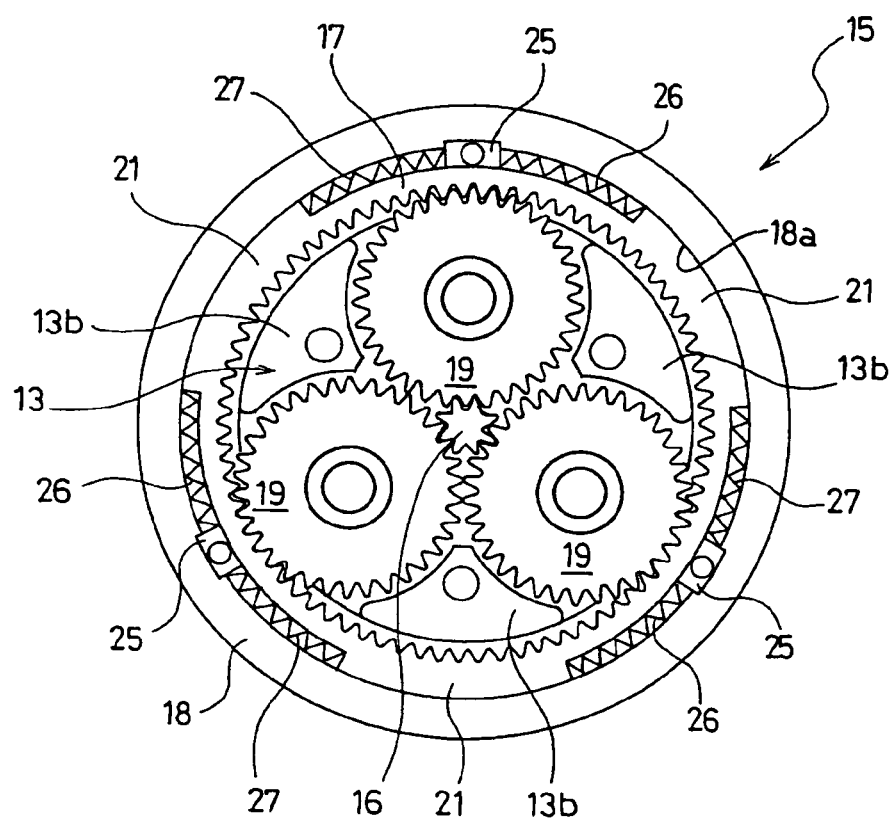
FIG. 3 is a cross-sectional view taken along line III-III of FIG. 2.

Referring to FIGS. 2 and 3, the reduction mechanism 15 includes a planetary gear reduction mechanism. The planetary gear reduction mechanism includes a sun gear 16 disposed on the left side of a rotor 35 of the electric motor 14 and rotatable with the rotor 35; an internal gear 17 rotatably fixed in an opening 18a of a first supporting member 18 of the base frame 12; a predetermined number of (three in the example of FIG. 3) planetary gears 19 in engagement with both of the sun gear 16 and the internal gear 17; and a carrier 20 that supports the planetary gears 19 rotatably.

Referring to FIGS. 3 and 4(a), the internal gear 17 has a predetermined number of (three in the figures) arc-shaped projections (corresponding to the internal-gear-side stoppers of the invention) 21 at regular intervals along the circumference. These projections 21 are guided by the opening 18a of the first supporting member 18. Referring to FIGS. 4(b) and 4(c), the projections 21 each have a recessed portion 22 in the circumferential center. Each recessed portion 22 accommodates a rotatable ball (e.g., steel ball) 23. The ball 23 is rotatably fitted in an arc-shaped groove 24 along the opening 18a of the first supporting member 18. Thus, the internal gear 17 can be rotated smoothly with respect to the first supporting member 18 with relatively small force.

Around the rim of the opening 18a of the first supporting member 18, arc-shaped projections (corresponding to the frame-side stoppers in embodiments of the invention) 25 of the same number as the projections 21 (three in the figures) projecting in the radial direction are provided at regular intervals along the circumference. These projections 25 guide the outer periphery of the internal gear 17 between the adjacent projections 21. Between the projections 21 and the projections 25 adjacent thereto, compression springs 26 and 27 are loaded in an arc shape. One spring 26 constantly urges the internal gear 17 clockwise (in the belt retracting direction) in FIG. 3 with relatively small force. The other spring 27 constantly urges the internal gear 17 counterclockwise (in the belt withdrawing direction) in FIG. 3 with relatively small force.

In a normal state in which the seatbelt 6 is off, the projections 21 of the internal gear 17 are placed in the circumferential center between the adjacent projections 25 by the spring force of the springs 26 and 27. When the spool 13 rotates in the belt withdrawing direction in that state, the internal gear 17 also rotates in the belt withdrawing direction α, as shown in FIG. 4(a). This rotation of the internal gear 17 disables the transmission of power by the reduction mechanism 15 so as to cut off the direct connection between the spool 13 and the electric motor 14, so that the rotation of the spool 13 is not transmitted to the electric motor 14. When the internal gear 17 rotates at a predetermined angle (30 degrees in the figure), circumferential ends 21a of the projections 21 come into engagement with circumferential ends 25a of the projections 25 that are adjacent thereto in the belt withdrawing direction, whereby the internal gear 17 stops rotating in the belt withdrawing direction α. The stop of the rotation of the internal gear 17 enables the power transmission by the reduction mechanism 15.

Conversely, when the spool 13 rotates in the belt retracting direction, the internal gear 17 also rotates in the belt retracting direction. When the internal gear 17 rotates at a predetermined angle (e.g., 30 degrees as in the belt withdrawing direction), circumferential ends 21b of the projections 21 come into engagement with circumferential ends 25b of the adjacent projections 25 that are adjacent thereto in the belt retracting direction, whereby the internal gear 17 stops rotating in the belt retracting direction. This arrangement enables the power transmission of the reduction mechanism 15, bringing the spool 13 and the electric motor 14 into direct connection.

The carrier 20 is fixed to the spool 13 so as to rotate therewith. The left end of the spool 13 is radially supported by the sun gear 16 via the carrier 20 and the planetary gears 19.

Figure 5:
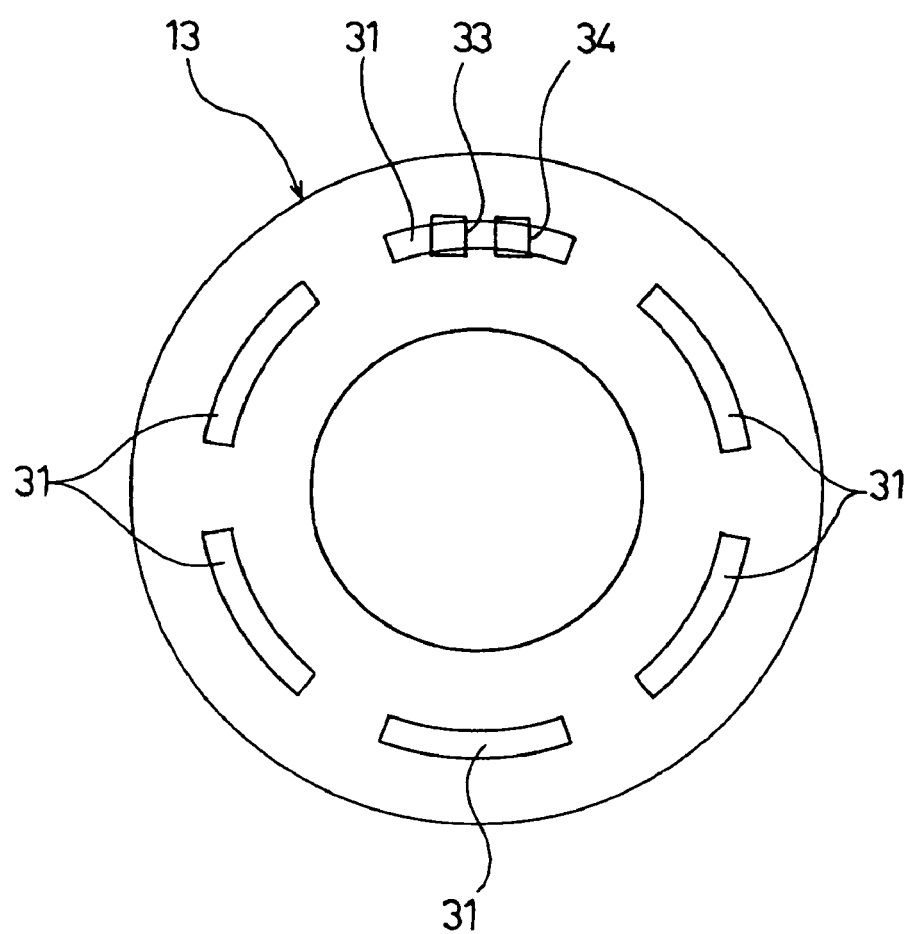
FIG. 5 is an explanatory diagram of a sensor for sensing the rotation and rotating direction of a spool.

The left end of the spool 13 is rotatably supported by the internal gear 17 via a thrust bearing 28 in the axial direction (in the thrusting direction), while the right end is rotatably supported by an electric-motor housing 29 via a bearing 30 in the radial direction and the axial direction. Referring to FIGS. 2 and 5, a predetermined number of arc-shaped magnets 31 are disposed at the right end of the spool 13. The magnets 31 are disposed at regular intervals on a concentric circle. On a second support member 32 of the base frame 12, a pair of hall ICs 33 and 34 each composed of a hall element is opposed to the magnets 31. The hall ICs 33 and 34 both connect to the ECU 10. The hall ICs 33 and 34 serve as one of the input units 11. When the spool 13 rotates, the magnets 31 also rotate to thereby sense the rotation and rotating direction of the spool 13. Thus, the signal is provided to the ECU 10.

Referring to FIG. 2, the spool 13 has a closed cylindrical shape in which the right end is open and the left end has a bottom 13a. A cylindrical rotation shaft 13b projects leftward from the bottom 13a. The rotation shaft 13b passes through the opening 18a of the first supporting member 18.

The electric motor 14 is configured as a known inner-rotor brushless motor. A magnetic disc 36 is disposed at the right end of the rotor 35 of the electric motor 14. The magnetic disc 36 can rotate with the rotor 35. The electric motor 14 is housed in the spool 13 coaxially therewith.

The electric-motor housing 29 has a hall sensor 37. The magnetic disc 36 and the hall sensor 37 together form a rotation amount sensor 38 for sensing the rotation amount of the electric motor 14. The rotation amount sensor 38 is one of the input units 11 for inputting a signal indicative of the rotation amount of the electric motor 14, which is measured by the rotation amount sensor 38, to the ECU 10.

A mounting flange 29a is disposed at the right end of the motor housing 29. When the electric motor 14 is inserted axially from the right side into the spool 13, then a ring-shaped step 29b of the mounting flange 29a is fitted in an opening 32a of the second support member 32 and the mounting flange 29a is fixed to the second support member 32 with a fixture (not shown).

The action of the seatbelt retractor 3 with this arrangement will be described.

When a seatbelt 6 is not worn by an occupant (off), the seatbelt 6 has completely been retracted by the seatbelt retractor 3. In this state, the electric motor 14 is not energized in a stop state, as described above, and the projections 21 are located in the center between adjacent projections 25.

When the occupant withdraws the seatbelt 6 to wear the seatbelt 6, the spool 13 starts to rotate in the belt withdrawing direction. As the spool 13 rotates in the belt withdrawing direction, the internal gear 17 also rotates in the belt withdrawing direction. This rotation of the internal gear 17 in the belt withdrawing direction disables the transmission of power by the reduction mechanism 15 so as to cut off the direct connection between the spool 13 and the electric motor 14. The rotation of the spool 13 is not transmitted to the electric motor 14, thus resulting in low belt retracting resistance, as described above. Accordingly, the occupant can easily withdraw the seatbelt 6 without sensing the weight during withdrawing the seatbelt 6. On the other hand, the hall ICs 33 and 34 detect the start of the rotation of the spool 13 in the belt withdrawing direction, and sends the detection signal to the ECU 10. Then the ECU 10 drives the electric motor 14 in the belt withdrawing direction.

When the circumferential ends 21a of the projections 21 come into contact with the circumferential ends 25a of the projections 25 to stop the rotation of the internal gear 17, the transmission of power of the reduction mechanism 15 is enabled to directly connect the spool 13 and the electric motor 14. Thus the rotation of the rotor 35 of the electric motor 14 is transmitted to the planetary gears 19 via the sun gear 16, thereby rotating the planetary gears 19 on their own axes. Then the planetary gears 19 revolve around the sun gear 16 by the rotation, so that the spool 13 is rotated via the carrier 19 while reducing speed. In this case, the ECU 10 controls the rotation of the electric motor 14 in response to the rotation amount signal from the rotation amount sensor 38. In this way, the seatbelt retractor 3 assists the occupant to withdraw the seatbelt 6 by the torque of the electric motor 14, so that the occupant can withdraw the seatbelt 6 with relatively small force.

Thus the spool and motor disconnecting mechanism and the internal-gear-rotation enabling mechanism of the invention are configured of the projections 21 of the internal gear 17, the projections 25 of the first supporting member 18, and the springs 26 and 27.

When the seatbelt 6 is withdrawn by a specified amount necessary for wearing it, or when the spool 13 rotates in the belt withdrawing direction by a specified amount, the ECU 10 stops the driving of the electric motor 14 in response to the detection signal from the hall ICs 33 and 34. Then the internal gear 17 rotates in the belt retracting direction by the spring force of the springs 26 and 27, whereby the projections 21 returns to the center between the adjacent projections 25 into the initial state.

When the occupant inserts the tongue 8 into the buckle 9, a switch (not shown) of the buckle 9, which is one of the input units 11, is turned on to send a signal indicative of the engagement of the tongue 8 with the buckle 9 to the ECU 10. Thus the ECU 10 drives the electric motor 14 in the belt retracting direction. Then the internal gear 17 rotates in the belt retracting direction because the reduction mechanism 15 is disabled to transmit power. Then the circumferential ends 21b of the projections 21 come into contact with the circumferential ends 25b of the projections 25 so that the rotation of the internal gear 17 stops. The spool 13 therefore rotates in the belt retracting direction while being reduced in speed by the torque of the electric motor 14, as described above. Thus the excessively withdrawn portion of the seatbelt 6 is retracted.

As the electric motor 14 is controlled so as to rotate in a forward or reverse direction, the spool 13 rotates in the belt retracting direction or the belt withdrawing direction. The ECU 10 controls the rotation of the electric motor 14 to retract the seatbelt 6 for retraining of the occupant or housing the seatbelt 6, or to assist the occupant to withdraw the seatbelt 6 for wearing it, in response to the various input signals from the input units 11.

The other actions of the seatbelt retractor 3 are the same as those of the known seatbelt retractors that retract and withdraw seatbelts by an electric motor.

In the seatbelt retractor 3 of the embodiment, the transmission of power of the reduction mechanism 15 is disabled at the start of withdrawal of the seatbelt 6, and the transmission of power of the reduction mechanism 15 is enabled when the seatbelt 6 is withdrawn by a specified amount. This arrangement can reduce the temporary weight during withdrawing the seatbelt 6 (belt withdrawing resistance). Thus the uncomfortable feeling during the withdrawal of the seatbelt can be reduced.

Particularly, the reduction mechanism 15 comprises the planetary gear mechanism, while the spool and motor disconnecting mechanism comprises the internal-gear-rotation enabling mechanism that allows the internal gear 17 to temporarily rotate in the belt withdrawing direction by a specified amount and stops the internal gear 17 from rotating in the belt withdrawing direction by an amount exceeding a specified amount during withdrawal of the seatbelt 6. This arrangement enables the planetary gear mechanism of the reduction mechanism 15 to be used for the internal-gear-rotation enabling mechanism. This simplifies the arrangement of the seatbelt retractor 3.

Since the internal-gear-rotation enabling mechanism comprise the projections 21 and 25 with a simple structure, the arrangement of the seatbelt retractor 3 can be further simplified.

With the seatbelt system including the seatbelt retractor 3 of the embodiment, the occupant can wear the seatbelt 6 comfortably when withdrawing the seatbelt 6 without sensing the weight due to the cogging torque of the electric motor 14.

With the seatbelt retractor 3 of the embodiment, the hall ICs 33 and 34 and the magnets 31 for sensing the rotation amount of the spool 13 and the rotation amount sensor 38 for sending the rotation amount of the electric motor 14 are provided individually. Embodiments of the invention are not limited to that but may have only the hall ICs 33 and 34 and the magnets 31 for sensing the rotation amount of the spool 13 and may not have the rotation amount sensor 38. In this case, the driving of the electric motor 14 is controlled on the basis of the rotation amount of the spool 13 sensed by the hall ICs 33 and 34 and the magnets 31. This arrangement can reduce the number of components.

The electric motor 14 of the seatbelt retractor 3 in the embodiment is housed in the cylindrical spool 13. Embodiments of the invention, however, may be applied to any seatbelt retractor 3 in which the spool 13 and the electric motor 14 are directly connected via the reduction mechanism and the direct connection between the spool 13 and the electric motor 14 can be cut off, including the seatbelt retractor disclosed in JP Pub. No. '252 in which the electric motor 14 is disposed outside the spool 13 coaxially therewith, and a seatbelt retractor in which the electric motor 14 is disposed outside the spool 13 in parallel therewith.

The seatbelt retractor and the seatbelt system having the same according to embodiments of the invention can be applied appropriately to seatbelt retractors for use in seatbelt systems for retraining occupants with seatbelts to protect them and having a base frame that rotatably supports a spool for retracting and withdrawing the seatbelt, and to seatbelt systems having the same.

Japan Priority Application 2005-226390, filed Aug. 4, 2005 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seatbelt retractor comprising:
   a spool for withdrawably retracting a seatbelt;
   a motor that generates a torque for rotating the spool in a belt retracting direction and a belt withdrawing direction;
   a reduction mechanism that connects the spool and the motor with each other to transmit the rotation of the motor, the seatbelt retractor driving the rotation of the motor in the belt withdrawing direction as the seatbelt is withdrawn; and
   a spool and motor disconnecting mechanism that temporarily disconnects the connection between the spool and the motor when the seatbelt is withdrawn,
   wherein the spool and motor disconnecting mechanism includes an internal-gear-rotation enabling mechanism that allows an internal gear to temporarily rotate in the belt withdrawing direction by a predetermined amount and to stop the internal gear from rotating in the belt withdrawing direction by an amount exceeding the predetermined amount when the seatbelt is withdrawn,
   wherein the spool and the reduction mechanism are supported by a frame,
   wherein the internal-gear-rotation enabling mechanism includes an arc-shaped frame-side stopper provided on the frame and first and second arc-shaped internal-gear-side stoppers, at least one of the arc-shaped internal-gear-side stoppers comes into contact with the arc-shaped frame-side stopper when the internal gear rotates in the belt withdrawing direction by the predetermined amount to thereby stop the rotation of the internal gear in the belt withdrawing direction, and
   the arc-shaped frame-side stopper being separated from the first and second arc-shaped internal-gear-side stoppers by first and second springs, one spring on each side of the arc-shaped frame-side stopper.

2. The seatbelt retractor according to claim 1, wherein the reduction mechanism comprises:
   a sun gear,
   the internal gear,
   planetary gears in engagement with the sun gear and the internal gear, and a carrier supporting the planetary gears rotatably, wherein the sun gear is disposed to rotate with a rotor of the motor, and the carrier is disposed to rotate with the spool, wherein the internal gear is disposed to rotate in the belt withdrawing direction by a predetermined amount at least when the seatbelt is withdrawn.

3. The seatbelt retractor according to claim 1, wherein the first spring urges the internal gear in the belt retracting direction.

4. The seatbelt retractor according to claim 1, wherein the second spring urges the internal gear in the belt withdrawing direction.

5. The seatbelt retractor according to claim 1, wherein the motor is positioned inside the spool.

6. A seatbelt system comprising:

a seatbelt for restraining an occupant;

a tongue slidably supported by the seatbelt;

a buckle detachably latched with the tongue; and a seatbelt retractor, the seatbelt retractor including:
a spool for withdrawably retracting a seatbelt;
a motor that generates a torque for rotating the spool in a belt retracting direction and a belt withdrawing direction;
a reduction mechanism that connects the spool and the motor with each other to transmit the rotation of the motor, the seatbelt retractor driving the rotation of the motor in the belt withdrawing direction as the seatbelt is withdrawn; and
a spool and motor disconnecting mechanism that temporarily disconnects the connection between the spool and the motor when the seatbelt is withdrawn, wherein the spool and motor disconnecting mechanism includes an internal-gear-rotation enabling mechanism that allows an internal gear to temporarily rotate in the belt withdrawing direction by a predetermined amount and to stop the internal gear from rotating in the belt withdrawing direction by an amount exceeding the predetermined amount when the seatbelt is withdrawn, wherein the spool and the reduction mechanism are supported by a frame, wherein the internal-gear-rotation enabling mechanism includes an arc-shaped frame-side stopper provided on the frame and first and second arc-shaped internal-gear-side stoppers, at least one of the arc-shaped internal-gear-side stoppers comes into contact with the arc-shaped frame-side stopper when the internal gear rotates in the belt withdrawing direction by the predetermined amount to thereby stop the rotation of the internal gear in the belt withdrawing direction, and the arc-shaped frame-side stopper being separated from the first and second arc-shaped internal-gear-side stoppers by first and second springs, one spring on each side of the arc-shaped frame-side stopper.

7. The seatbelt system according to claim 6, wherein the reduction mechanism comprises:

a sun gear, the internal gear, planetary gears in engagement with the sun gear and the internal gear, and a carrier supporting the planetary gears rotatably, wherein the sun gear is disposed to rotate with a rotor of the motor, and the carrier is disposed to rotate with the spool, wherein the internal gear is disposed to rotate in the belt withdrawing direction by a predetermined amount at least when the seatbelt is withdrawn.

8. The seatbelt system according to claim 6, wherein the first spring urges the internal gear in the belt retracting direction.

9. The seatbelt system according to claim 6, wherein the second spring urges the internal gear in the belt withdrawing direction.

10. The seatbelt system according to claim 6, wherein the motor is positioned inside the spool.

* * * * *